United States Patent
Leenders et al.

[11] Patent Number: 6,162,493
[45] Date of Patent: Dec. 19, 2000

[54] PROCESS FOR THE PREPARATION OF A HEAT MODE RECORDING ELEMENT

[75] Inventors: Luc Leenders; Eddie Daems, both of Herentals; Hieronymus Andriessen, Beerse, all of Belgium

[73] Assignee: Agfa-Gevaert, N.V., Mortsel, Belgium

[21] Appl. No.: 09/197,641

[22] Filed: Nov. 23, 1998

Related U.S. Application Data

[60] Provisional application No. 60/073,787, Feb. 5, 1998.

[30] Foreign Application Priority Data

Dec. 9, 1997 [EP] European Pat. Off. .............. 97203857

[51] Int. Cl.⁷ ................................ B41M 3/12; B05D 5/06
[52] U.S. Cl. ......................... 427/152; 427/152; 427/162; 427/508; 427/496; 427/404; 427/412.1; 427/393.5; 427/386; 427/383.1
[58] Field of Search ..................................... 427/146, 162, 427/508, 496, 404, 412.1, 393.5, 386, 383.1

[56] References Cited

FOREIGN PATENT DOCUMENTS

| | | |
|---|---|---|
| 0 225 647 A2 | 6/1987 | European Pat. Off. . |
| 0 225 647 A3 | 6/1987 | European Pat. Off. . |
| 0 321 704 A2 | 6/1989 | European Pat. Off. . |
| 0 321 704 A3 | 6/1989 | European Pat. Off. . |
| 0 361 704 A1 | 4/1990 | European Pat. Off. . |
| 0 473 346 A2 | 3/1992 | European Pat. Off. . |
| 0 509 671 A1 | 10/1992 | European Pat. Off. . |

*Primary Examiner*—Timothy Meeks
*Assistant Examiner*—Jennifer Kolb
*Attorney, Agent, or Firm*—Breiner & Breiner

[57] ABSTRACT

A process is disclosed for the preparation of a heat mode recording element of the DRAW type (Direct Read After Write), said process comprising the following steps:

(A) providing a material having following layer arrangement, in order:
  (1) a transparent support optionally subbed,
  (2) a thin metal layer coated from an aqueous medium containing metal particles,
  (3) a coated single top layer curable by radiation,
(B) radiation curing said coated single top layer (3).

In the preferred embodiment of the present invention the metal layer is a bismuth layer.

12 Claims, No Drawings

PROCESS FOR THE PREPARATION OF A HEAT MODE RECORDING ELEMENT

This application claims priority benefit to provisional application 60/073,787, filed Feb. 5, 1998.

FIELD OF THE INVENTION

The present invention relates to a process for the preparation of an improved heat mode material of the DRAW type (Direct Read After Write) based on a thin metal layer.

BACKGROUND OF THE INVENTION

Conventional photographic materials based on silver halide are used for a large variety of applications. As is generally known silver halide materials have the advantage of high potential intrinsic sensitivity and excellent image quality. On the other hand they show the drawback of requiring several wet processing steps employing chemical ingredients which are suspect from an ecological point of view.

In the past several proposals have been made for obtaining an imaging element that can be developed using only dry development steps without the need of processing liquids as it is the case with silver halide photographic materials.

A dry imaging system known since quite a while is 3M's Dry Silver technology. Another type is based on photopolymerisation.

As a further alternative for silver halide chemistry dry imaging elements are known that can be image-wise exposed using an image-wise distribution of heat. When this heat pattern is applied directly by means of a thermal head such elements are called thermographic materials. When the heat pattern is applied by the transformation of intense laser light into heat these elements are called heat mode materials or thermal imaging media.

A particular type of heat mode materials is based on the chemical reduction of organic silver salts. Another category is based on change of adhesion.

In still another particular type of heat mode recording information is recorded by creating differences in reflection and/or in transmission on the recording layer. The recording layer has high optical density and absorbs radiation beams which impinge thereon. The conversion of radiation into heat brings about a local temperature rise, causing a thermal change such as evaporation or ablation to take place in the recording layer. As a result, the irradiated parts of the recording layer are totally or partially removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346)

The recording layer of such heat mode recording materials is usually made of metals, dyes, or polymers. Recording materials like this are described in 'Electron, Ion and Laser Beam Technology", by M. L. Levene et al.; The Proceedings of the Eleventh Symposium (1969); "Electronics" (Mar. 18, 1968), P. 50; "The Bell System Technical Journal", by D. Maydan, Vol. 50 (1971), P. 1761; and "Science", by C. O. Carlson, Vol. 154 (1966), P. 1550.

Recording on such thermal recording materials is usually accomplished by converting the information to be recorded into electrical time series signals and scanning the recording material with a laser beam which is modulated in accordance with the signals. This method is advantageous in that recording images can be obtained on real time (i.e. instantaneously). Recording materials of this type are called "Direct Read After Write" (DRAW) materials. DRAW recording materials can be used as a medium for recording an imagewise modulated laser beam to produce a human readable or machine readable record.

According to EP 0 384 041 a process is provided for the production of a heat mode recording material having DRAW possibilities wherein a web support is provided with a heat mode recording thin metal layer, preferably a bismuth layer, characterized in that in the same vacuum environment a protective organic resin layer in web form is laminated to said supported recording layer by means of an adhesive layer.

A commercially available material manufactured according to the principles of cited EP 0 384 041 is MASTERTOOL MT8, registered trade name, marketed by Agfa-Gevaert N.V. It is mostly used after recording as master in the manufacturing of microelectronic circuits and printed circuit boards. We refer to the description in *Circuit World*, Vol. 22, No. 3, April 1996.

In EP 0 687 569 a further alternative to the teachings of EP 0 384 041 is disclosed. In this embodiment, the adhesive layer plus organic resin web is replaced by a single adhesive layer, or by a multiple layer assemblage, applied by lamination in the vacuum chamber, whereby said single adhesive layer or the outermost layer of said assemblage is hardened by heat and/or by ultra-violet radiation or electron beam radiation.

A drawback of the method of preparation of a thin bismuth recording layer by vacuum deposition is the fact that this is a complicated, cumbersome and expensive process.

Therefore, in European patent application appl. No. 9720182 the vacuum deposition is replaced by coating from an aqueous medium. According to this disclosure a thin metal layer is formed by the following steps:

(1) preparing an aqueous medium containing ions of a metal,
(2) reducing said metal ions by a reducing agent thus forming metal particles,
(3) coating said aqueous medium containing said metal particles on a transparent support.

In the preferred embodiment of the cited invention the metal is bismuth.

In this embodiment the laminated protective element disclosed in EP 0 687 569 can simply be replaced by a coated double layer pack, a first weak layer having a good adherance to the metal layer, and a top protective hard layer. Examples of such double layer packs are disclosed in example 4 of the cited application. A drawback from this procedure is the need for a double layer which implies a more complicated coating procedure.

The present invention extends the teachings on heat mode materials based on a thin metal recording layer coated from an aqueous medium.

OBJECTS OF THE INVENTION

It is the object of the present invention to provide a simple, straightforward and economic process for the preparation of a heat mode element based on a thin metal layer coated from an aqueous medium.

SUMMARY OF THE INVENTION

The object of the present invention is realized by providing a process for the preparation of a heat mode recording element, said process comprising the following steps:

(A) providing a material having following layer arrangement, in order:
  (1) a transparent support optionally subbed,
  (2) a thin metal layer coated from an aqueous medium containing metal particles,
  (3) a coated single top layer curable by radiation,
(B) radiation curing said coated single top layer (3).

In the farmost preferred embodiment of the present invention the metal layer is a bismuth layer. The bismuth particles are preferably prepared by reduction of a solution containing bismuth ions. Preferably the curing is accomplished by ultra-violet radiation.

DETAILED DESCRIPTION OF THE INVENTION

The different elements constituting the heat mode recording material obtained by the process according to the present invention will now be explained in more detail.

Useful transparent organic resin supports include e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. The thickness of such organic resin film is preferably comprised between 0.05 and 0.35 mm. In a most preferred embodiment of the present invention the support is a polyethylene terephthalate layer provided with a subbing layer. This subbing layer can be applied before or after stretching of the polyester film support. The polyester film support is preferably biaxially stretched at an elevated temperature of e.g. 70–120° C., reducing its thickness by about ½ to ⅙ or more and increasing its area 2 to 9 times. The stretching may be accomplished in two stages, transversal and longitudinal in either order or simultaneously. The subbing layer is preferably applied by aqueous coating between the longitudinal and transversal stretch, in a thickness of 0.1 to 5 mm. In case of a bismuth recording layer the subbing layer preferably contains, as described in European Patent Application EP 0 464 906, a homopolymer or copolymer of a monomer comprising covalently bound chlorine. Examples of said homopolymers or copolymers suitable for use in the subbing layer are e.g. polyvinyl chloride, polyvinylidene chloride, a copolymer of vinylidene chloride, an acrylic ester and itaconic acid, a copolymer of vinyl chloride and vinylidene chloride, a copolymer of vinyl chloride and vinyl acetate, a copolymer of butylacrylate, vinyl acetate and vinyl chloride or vinylidene chloride, a copolymer of vinyl chloride, vinylidene chloride and itaconic acid, a copolymer of vinyl chloride, vinyl acetate and vinyl alcohol etc. Polymers that are water dispersable are preferred since they allow aqueous coating of the subbing layer which is ecologically advantageous.

The preferred process for preparing the aqueous medium from which the thin metal layer (2) is coated comprises the following steps:
  (i) preparing an aqueous solution containing the corresponding metal ions,
  (ii) reducing said metal ions by a suitable reducing agent thus forming metal particles.

This process will now be explained in detail on the hand of the preferred embodiment wherein the metal is bismuth.

In a first step (i) an aqueous solution of bismuth ions is prepared. As most suitable bismuth salt bismuth nitrate is chosen. Almost all bismuth salts are poorly soluble in water. In order to maintain a sufficient amount of bismuth ions in solution, it is necessary to add a complexing agent. A preferred complexant is simply the well-known ethylenediaminetetraacetic acid (EDTA) or a homologous compound or a salt thereof. Another preferred one is citrate, e.g. triammonium citrate. Other suitable complexants include diethylenetriamine-pentaacetic acid (DTPA), trans-1,2-diaminocyclohexane-N,N,N',N'-tetraacetic acid (CDTA), ethyleneglycol-O,O'-bis(2-aminoethyl)-N,N,N',N'-tetraacetic acid (EGTA), N-(2-hydroxyethyl)ethylenediamine-N,N,N'-triacetic acid (HEDTA), etc. In order to keep the metal bismuth that will be formed by reduction in the next step in dispersion a protective binder is preferably added to the aqueous medium. A particularly preferred protective binder is carboxymethylcellulose (CMC), preferably of the high viscosity type. Other possible binders include gelatin, arabic gum, poly(acrylic acid), cellulose derivatives and other polysaccharides. The solution can further contain a so-called dispersing aid (also called co-dispersing agent). Suitable dispersing aids in the case of bismuth are pyrophosphates, more particularly a hexametaphosphate such as sodium hexametaphosphate. Probably, the hexametaphosphate adsorbs to the surface of the bismuth particles so that they become negatively charged. By electrostatic repulsion they are kept in dispersion.

In a following step (ii) the bismuth ions in the solution are reduced to metal bismuth particles by means of the addition of a reducing agent. The metal particles are kept in dispersion by the presence of the binder and dispersing aid as described above. A preferred reducing agent is sodium hydrosulphite. Another suitable reducing agent is $KBH_4$. Others include glucose, formaldehyde, tin(II)chloride. The reducing agent can be added to the original bismuth salt solution as a solid powder. On the other hand the reducing agent can be dissolved separately and added to the bismuth salt solution according to a single jet or a double jet procedure. When the reduction is substantially completed the aqueous medium can directly be coated according to step (3), but more preferably the superfluous salts are first removed from the aqueous medium in a step 2bis, by well-known methods such as ultracentrifugation followed by redispersing, flocculation and washing followed by redispersing, or ultrafiltration. In the case of ultracentrifugation, and using CMC as binder a bismuth-CMC deposit is separated. The ultracentrifugation step may be repeated after washing with fresh water. The final deposit is redispersed in an aqueous medium, preferably containing the same or different binder and/or dispersion aid as the original solution. In the case of a bismuth-CMC deposit the redispersing aqueous medium preferably contains the same dispersing aid as the original solution, e.g. sodium hexametaphosphate. In the final aqueous medium preferable an antioxidant, added at any stage of the preparation, such as ascorbic acid or a derivative thereof is present in order to avoid oxidation to bismuth oxide which would lead to an unacceptable density loss during drying after coating or during conservation of the unprotected bismuth layer. Finally, after the addition of one or more coating agents the obtained aqueous medium is coated on the transparent substrate by means of a conventional coating technique.

The particle size of the reduced metallic bismuth is preferably comprised between 5 and 300 nm, most preferably 10 and 200 nm. The thickness of this Bi layer is preferably comprised between 0.1 and 1.5 μm. When this thickness is too low the recorded images do not have sufficient density. When on the other hand the thickness is too high the sensitivity tends to decrease and the minimal density, i.e. the density after laser recording on the exposed areas tends to be higher.

The formation of the thin metal recording layer has been described on the hand of the preferred embodiment wherein the metal is bismuth. However, the scope of the present invention is not limited to bismuth, but extends to other metals that can form thin metal recording layers by a similar procedure. Possible other metals for the recording layer in this invention include Mg, Mn, Cu, Ag, Au, Zn, Cd, Al, Ga, In, Ge, Sn, As, Sb, Se, Te, Sr, Cu, La, Pb, Nd, Ba, Be, Ca, and Ce. These metals can be used alone or as a mixture or alloy of at least two metals thereof.

It will be readily understood that for each particular metal the choice of the metal ions, the complexant if any, the binder and dispersing aid, the reducing agent, etc., must be optimized and that the preferred embodiments will in most cases deviate from the preferred embodiments wherein the metal is bismuth.

The single coated protective layer (3) contains as main ingredient a radiation curable prepolymer also called oligomer, or a curable monomer, or both. In the latter case the liquid monomer can act as a solvent for the prepolymer so that the presence of a conventional organic solvent can be avoided. A further important ingredient in this layer (3) is a photoinitiator inducing polymerisation upon UV radiation. Electron beam curable systems normally require no photoinitiator because of the high energy level of the electrons.

UV-curable coated layers can broadly be classified into two categories: free radical polymerisable, and cationic polymerisable.

In the first type of composition the photoinitiator generates a free radical upon UV exposure. In such a composition the reactive (pre)polymer or oligomer is a compound containing one or more ethylenically unsaturated groups.

Reactive polymers containing ethylenically unsaturated groups are commercially available from BOMAR Specialities Company under the tradename of JAYLINK (modified cellulose polymers containing acrylamidomethyl groups).

Examples of suitable prepolymers for use in a radiation-curable composition of the adhesive layer applied according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryl-type end groups are described in published EP-A 0 207 257 and Radiat. Phys. Chem., Vol. 33, No. 5, 443–450 (1989).

Copolyesters substantially free from low molecular weight, unsaturated monomers and other volatile substances are of very low toxicity (ref. the periodical Adhasion 1990 Heft 12, page 12). The preparation of a large variety of radiation-curable acrylic polyesters is given in German Offenlegungsschrift No. 2838691. Mixtures of two or more of said prepolymers may be used.

Further prepolymers suited for use in radiation (UV or EB) curable compositions are selected from the group consisting of unsaturated urethane(meth)acrylates, epoxy (meth)acrylates, polyether(meth)acrylates and polyester (meth)acrylates as described e.g. in "Chemistry & Technology of UV and EB formulation for coatings, inks and paints" Vol.2: Prepolymers and Reactive diluents for UV and EB curable formulations." Ed. P.K.T. OLDRING—SITA Technology—London (1991).

A survey of UV-curable coating compositions is given e.g. in the periodical "Coating" September 1988, p. 348–353.

Other usable prepolymers also called oligomers belong to the class of aliphatic and aromatic polyester-urethane acrylates. The structure of polyester-urethane acrylates is given in the booklet "Radiation Cured Coatings" by John R. Constanza, A. P. Silveri and Joseph A. Vona, published by Federation of Societies for Coatings Technology, 1315 Walnut St. Philadelphia, Pa. 19107 USA (June 1986) p. 9.

In case of use of addition polymerizable monomers these may be monofunctional or plurifunctional by which is meant that they may contain one or more olefinically unsaturated groups. Examples of monofunctional addition polymerizable liquid monomers that may serve as solvent for the above defined polymers (i) and (ii) are the following: methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n.-hexyl acrylate, lauryl acrylate, and tetrahydrofurfuryl methacrylate.

Examples of suitable difunctional monomers are: 1,6-hexanediol diacrylate, 1,6-hexanediol dimethacrylate, neopentylglycol diacrylate, 1,4-butanediol diacrylate, ethyleneglycol diacrylate, polyethyleneglycol diacrylate, pentaerythritol diacrylate, divinylbenzene.

Examples of suitable tri- or more-functional monomers are: trimethylolpropane triacrylate, trimethylolpropane trimethacrylate, pentaerythritol triacrylate, dipentaerythritol hexaacrylate, an acrylate of ethylenediamine, aliphatic and aromatic urethane acrylates and the monomers according to general formula (I) described in non-published European patent application No. 91200468.6 filed Mar. 5, 1991, wherein reference is made for the preparation of said monomers to published German patent applications Nos. 3,522,005, 3,703,080, 3,643,216, 3,703,130, 3,703,080, 3,917,320 and 3,743,728.

In a preferred embodiment of the present invention the UV-curable substance is a multifunctional acrylate monomer, most preferably an epoxy-acrylate monomer.

Photoinitiators suitable for use in photo-radical production belong to the class of organic carbonyl compounds, for example, benzoin ether series compounds such as benzoin isopropyl, isobutylether; benzil ketal series compounds; ketoxime esters; benzophenone series compounds such as benzophenone, obenzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc.

The amount of the photoinitiator used is preferably within the range of 0.01 to 5 parts by weight relative to 100 parts by weight of the addition polymerizable compound(s).

In the cationically polymerisable type of UV curable coatings the photoinitiator generates a proton or cation on exposure. In a typical embodiment this cation causes cycloaliphatic epoxide molecules to crosslink quickly with each other, with hydroxyl compounds, and/or with vinyl ether compounds. Cationically cured UV systems are usually formulated with members of these classes of compounds.

Apparatuses for radiation curing are known to those skilled in the art and are commercially available. When applying a photoinitiator in the primer layer composition the curing can proceed advantageously with ultraviolet radiation. For example, the curing proceeds with medium pressure mercury arc lamps or pulsed xenon arcs. These ultraviolet sources usually are equipped with a cooling installation, an installation to remove the produced ozone and a nitrogen inflow to exclude air from the surface of the product to be cured during radiation processing. An intensity of 40 to 120 W/cm in the 200–400 nm region is usually employed. An example of a commercially available ultraviolet source is IST supplied by Strahlentechnik, Oberboihingen, W. Germany.

High energy ionizing radiation such as X-rays, gamma rays, beta rays and accelerated electrons can also be used to accomplish curing of the coating.

UV radiation is better suited for non-pigmented or slightly pigmented systems having relatively thin films to allow sufficient penetration of the irradiation.

When the top protective layer has to possess high UV transmittance it is advantageous to work without UV absorbing photoinitiator and to apply electron beam (EB) curing since therefor no photoinitiator is needed. The penetration power of electron beam radiation depends on the value of the electron accelerating voltage and on the absorption capacity of the coatings.

There are two types of electron beam accelerators: high energy scanner types and low energy linear-cathode types also called electrocurtain type accelerators. These accelerators are usually equipped with nitrogen inflow. A dose in the range of 0.01 to 10 megarads is employed. Examples of commercially available EB accelerators are PILOT 200 and CB175/60/380 both supplied by Energy Sciences Inc., Geneva, Switzerland. Electron beam curing is described e.g. in the periodical Adhasion 1990—Heft 12, pages 39–40. Curing periods of about 1 second duration are possible, especially in thin (10–20 micron) coatings.

In a preferred embodiment of the present invention the power distance towards the layer (3) and the exposure time of the UV exposure are optimized in such a way that a vertical hardening gradient is obtained, the harder part being located at the surface of layer (3) and the softer part being adjacent to the thin metal layer. The interior part of the layer, thanks to its relative softness and elasticity will allow for the formation of relative large bismuth spheres in the exposed parts having a diameter of about 1 to 1.5 $\mu$m. It will be readily understood that such relatively large microspheres, corresponding to a relatively small specific surface, will be favourable for obtaining a low Dmin. The hard exterior part of the hardening gradient situated on top of the layer assures good physical protection. It will be clear that such an hardening gradient will have the same favourable effect on Dmin in the previously disclosed embodiments wherein the bismuth layer is applied by vacuum deposition.

Apart from the above defined compounds the curable layer composition may contain additives playing a role in the coating stage or in the final layer. Examples of such additives are surfactants, solid lubricants, e.g. waxes, defoamers and anti-static agents.

The present invention will now be illustrated by following examples without however being limited thereto.

EXAMPLES

Example 1

Preparation of the bismuth dispersion

The following solutions were prepared:

| Solution 1 | |
| --- | --- |
| Water | 564 ml |
| $HNO_3$ (concentrated) | 83 ml |
| $Bi(NO_3)_3 \cdot 5H_2O$ | 329 g |
| Triammonium citrate (50% in water) | 1127 ml |
| $NH_3$ (26% in water) (pH = 12) | 305 ml |

| Solution 2 | |
| --- | --- |
| $Na_2S_2O_4$ (16.7% in water) | 1238 ml |

| Solution 3 | |
| --- | --- |
| Water | 650 ml |
| Triammonium citrate (50% in water) | 400 ml |
| Carboxymethylcellulose (3% in water) | 104 ml |
| $Na_6O_{18}P_6$ (2% in water/ethanol; 85/15) | 136 ml |

To solution 3, held at 40° C. and stirred at 450 rpm, solution 1 at a flow rate of 200 ml/min was simultaneously added with solution 2 at 112.5 ml/min. After the reduction, the bismuth dispersion was ultrafiltrated through a Fresenius F60 cartridge and diafiltrated with a 0.2% solution of sodium hexametaphosphate in water/ethanol (98.5/1.5).

The dispersion was stirred and 4 g of ascorbic acid, 10 ml of a 12.5% solution of Saponine Quillaya (Schmittmann) in water/ethanol (80/20) was added.

Subsequently this dispersion was coated on a substrated PET foil so that a UV-density of 3.5 (Macbeth optical densitometer) was obtained. This is the coated bismuth dispersion.

Preparation of the coated samples

Reference Sample A

On the bismuth layer, two protective layers are coated: a layer with a low $T_g$ and a toplayer with a high $T_g$, in order to give the material sufficient physical protection.

The first protective layer with a low $T_g$ consists of the commercially available film forming latex Neocryl BT9, being a copolyacrylate, and the toplayer consists of a co-polymer of ethylacrylate-metacrylic acid (20/80). The thickness of each protective layer is 3 $\mu$m. This is reference Sample A.

Invention Sample B

On the bismuth layer a 10 $\mu$m thick layer of a UV-curable cationic system based on cycloaliphatic epoxides was applied. The composition of this UV-curable coating was as follows:

| | |
| --- | --- |
| CYRACURE Cycloaliphatic Epoxide UVR-6110 (registered trade mark of Union Carbide) | 67.1 g |
| Cellulose-acetate-butyrate | 5.4 g |
| CYRACURE Photoinitiator UVI-6990 (aryl sulphonium salt; registered trade mark of Union Carbide) | 2.5 g |
| TONE Polyol 0305 (trifunctional flexibilizer) (registered trade mark of Union Carbide) | 20 g |
| EFKA 35 (surfactant) (available from EFKA Chemical) | 1 g |
| EUROPOX RVH 1,6-hexanediol-glycidylether (available from Schering Co.) | 4 g |

The coated layer was cured under a UV-unit at a power of 80 W/cm² at different exposure times according to the table furtheron.

Evaluation

The resulting materials were exposed by a NdYAG laser emitting at 1064 nm. The image plane power was set at 350 mW. A spot size of 16 $\mu$m was used together with a pitch of 8 $\mu$m at a scan speed of 4.4 m/s. The scratch-resistance was catagorised according to: 1=scratchable with a pair of scissors and 2=scratchable with a fingernail. The results are shown in the following table.

| Sample | UV-exposure time (curing time) | $D_{min}$ | Scratch-resistance |
| --- | --- | --- | --- |
| Sample A (ref) | — | 0.32 | 1 |
| Sample B (inv) | 2.4 sec | 0.56 | 1 |
| Sample B (inv) | 1.2 sec | 0.41 | 1 |
| Sample B (inv) | 0.7 sec | 0.38 | 1 |

No case with scratchability 2 was observed. The scratch resistance of the invention samples was as good as the scratch resistance of the reference sample which shows the more complicated double layer design of the protective assemblage above the bismuth later.

The table also illustrates the effect of the exposure time which influences the nature of the hardening gradient on the obtained Dmin. A relative short exposure time resulting in relatively large bimuth microspheres favours a low Dmin.

What is claimed is:

1. Process for the preparation of a heat mode recording element comprising:
   (A) providing a material having in order:
      (1) a transparent support optionally subbed,
      (2) a thin metal layer coated from an aqueous medium containing metal particles,
      (3) a coated single top layer curable by radiation, and
   (B) curing by radiation said coated single top layer (3).

2. Process according to claim 1 wherein said curing step (B) is carried out to provide a vertical curing gradient having a harder part and a softer part, the harder part being located at the surface of said layer (3), and the softer part being adjacent to the thin metal layer (2).

3. Process according to claim 1 wherein said layer (3) contains at least one compound selected from the group consisting of radically or cationically polymerisable monomers, and radically or cationically polymerisable prepolymers.

4. Process according to claim 3 wherein said compound is a multifunctional acrylate monomer.

5. Process according to claim 3 wherein said compound is a cycloaliphatic epoxide.

6. Process according to claim 1 wherein said curing step (B) occurs by ultra-violet radiation.

7. Process according to claim 6 wherein said layer (3) further contains a photoinitiator.

8. Process according to claim 1 wherein said curing step (B) occurs by electron beam.

9. Process according to claim 1 wherein said aqueous medium containing metal particles is prepared by the following steps:
   (i) preparing an aqueous medium containing metal ions,
   (ii) reducing said metal ions by a reducing agent thus forming metal particles.

10. Process according to claim 1 wherein said thin metal layer (2) is a bismuth layer and said metal particles are bismuth particles.

11. Process according to claim 10 wherein the average particle size of said bismuth particles is comprised between 10 and 200 nm.

12. Heat mode recording element prepared by a process according to claim 1.

* * * * *